June 12, 1923.
A. D. GOODWIN
OIL PRESSURE CLUTCH
Filed Jan. 11, 1922
1,458,287
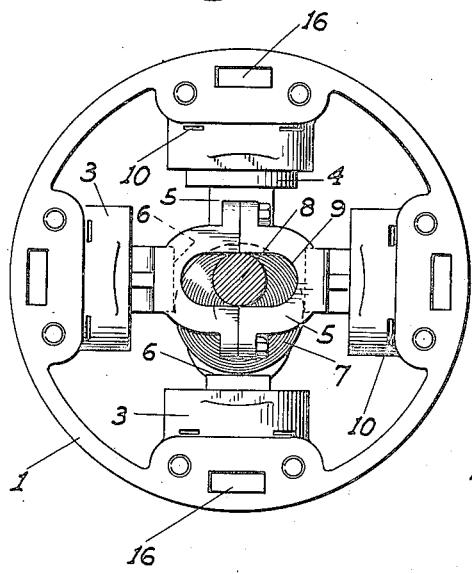
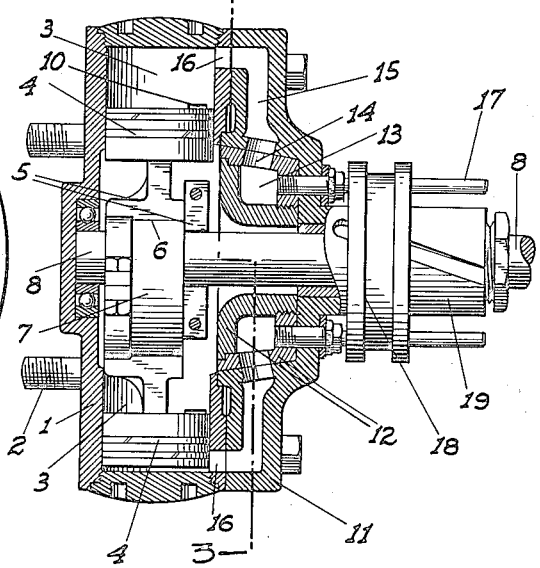
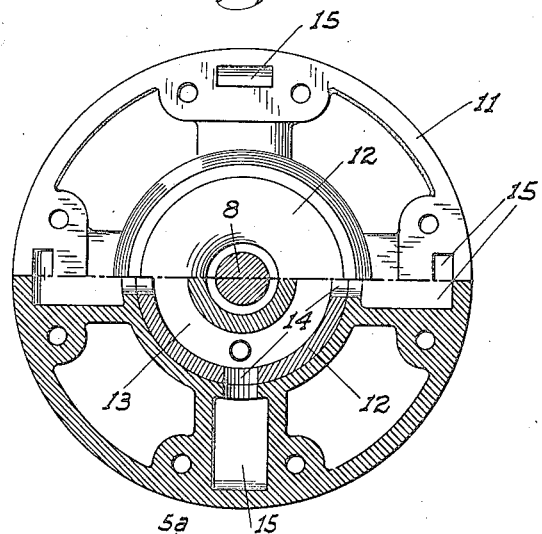
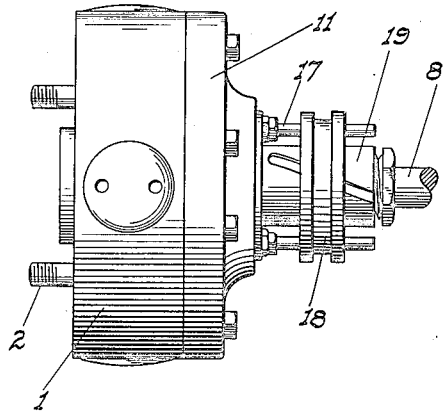
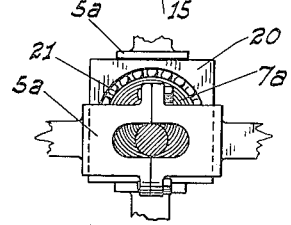
INVENTOR.
A. D. Goodwin
BY
ATTORNEY Patented June 12, 1923.

1,458,287

UNITED STATES PATENT OFFICE.

ALFRED D. GOODWIN, OF RIPON, CALIFORNIA.

OIL-PRESSURE CLUTCH.

Application filed January 11, 1922. Serial No. 528,518.

*To all whom it may concern:*

Be it known that I, ALFRED D. GOODWIN, a citizen of the United States, residing at Ripon, county of San Joaquin, State of California, have invented certain new and useful Improvements in Oil-Pressure Clutches; and I do declare the following to be a full, clear, and exact description of the same, reference being had to the drawings and to the characters of reference marked thereon, which form a part of this application.

This invention relates to improvements in that type of clutch device in which relative movement between the driving and driven members is governed by means of a manually controlled flow of oil, which may be regulated so that the practically incompressible oil will prevent any movement between the parts, or said oil may be allowed various degrees of freedom of flow, which will permit corresponding relative freedom of movement of the driving and driven members.

The present invention is particularly intended as an improvement over that type of similar device shown in my copending application for patent filed February 25th, 1921, Serial No. 447,854, the principal object being to simplify the construction of the device as much as possible, principally by the elimination of all auxiliary valves, retaining only the main control valve.

A further object is to eliminate the possibility of air pockets in the cylinders, due to the fact that the cylinders being filled by suction are sometimes not completely filled with oil, leaving an air pocket which causes unevenness in the power delivery. This elimination I accomplish by forcing the oil directly from one cylinder to the others through the radial passages and the passageway in the main valve. Since the cubical contents of cylinders and passages are always the same regardless of the position of the various pistons, it will be seen that the cylinders and passages are always completely filled with oil.

A third object is to provide means for counteracting any leakage of oil past the piston rings, which if allowed to take place unrestricted would soon reduce the efficiency of the device.

These objects I accomplish by means of such structure and relative arrangement of parts as will fully appear by a perusal of the following specification and claims.

In the drawings similar characters of reference indicate corresponding parts in the several views.

Fig. 1 is a face view of the device, with the cover plate and valve removed, and looking toward the drive-shaft end.

Fig. 2 is a sectional elevation of the complete structure.

Fig. 3 is a cross section taken on a line 3—3 of Fig. 2.

Fig. 4 is a side view of the device.

Fig. 5 is a fragmentary face view showing a modified form of eccentric means for driving the pistons.

Referring now more particularly to the drawings, the characters of reference on the drawings, the numeral 1 denotes a casing, open on one face for ease of manufacture and assembly, and provided on the opposite face with studs 2 or similar members whereby to attach it to the usual end flange of a driving shaft.

Formed with the casing and arranged in diametrically opposed pairs are cylinders 3 in each of which is slidable a piston 4, each opposed pair being rigidly connected together by a slotted yoke 5 arranged with flat faces 6 against which the face of an eccentric or cam 7 bears, this cam being fixed on the driven shaft 8 which passes through the slots 9 of the yokes.

One or more slot-like ports 10 is cut through the wall of each cylinder to communicate with the interior of the casing, the positioning of these ports relative to the pistons being such that when any piston is at the innermost point of its stroke, that is, nearest the shaft, the ports in the corresponding cylinder will be uncovered to communicate therewith, but will be covered during the major extent of travel of the piston. The purpose of these ports will be hereinafter explained.

Removably fitted onto the casing 1 over its open face is a cover member 11, turnably mounted in which and surrounding the shaft 8 is a rotary valve member 12, which is hollowed to form a circular or continuous chamber 13 from which ports 14 lead, adapted to register with radial passageways 15 in the cover, which in turn register permanently with ports 16 in the casing 1 which open into the cylinders adjacent their outer ends, it being understood that there are as many of these various ports and passageways as there are cylinders, there being preferably four of the latter.

The valve member is preferably taper-seated in the cover member, and may be rotated to close or open the ports regardless of the rotation of the casing and cover by any suitable means, such for instance as that fully described in the aforementioned copending application. This comprises roughly pins 17 fixed to the valve member and projecting through concentrically slotted holes in the cover and also through a sleeve 18 slidably mounted on the hub 19 of the cover, which sleeve, when imparted sliding or longitudinal movement along the hub, is also caused to rotate somewhat. This rotation then causes the valve member to be rotated also, by reason of the pins connecting these members, which causes the ports 14 to register with the passageways 15, or to be moved to close communication therewith, as the case may be.

In the modified form of driving eccentric shown in Fig. 5, the eccentric 7ª on the shaft is surrounded by a square block 20, forming a race for ball or similar bearings 21 bearing on the face of the eccentric.

The edge faces of this block bear against the corresponding faces of the piston-yokes 5ª for the entire extent of the latter at all times, thus giving a better bearing surface between the yokes and the member they engage than is possible with a plain eccentric.

In operation, the cylinders, passageways and valve chamber are filled with oil, while the casing or sump inwardly of the cylinders is only partially filled with oil, the sump and valve chamber etc. having no communication with each other except by reason of the ports 10.

It will therefore be evident that if the ports 14 are wide open, the oil can flow freely through the various passageways from one cylinder to the other, resulting of course in the pistons being free to move in and out of their cylinders with the rotation of the casing and without any movement being imparted to the shaft 8. It will also be seen that the even and smooth flow of the oil is not interrupted or disturbed by contact with the rotating and reciprocating pistons and yokes, such as is the case when the main oil supply is in the casing itself.

Now as the ports 14 are gradually closed, the resistance to the flow of oil becomes correspondingly greater, until when the ports are fully closed the pistons can have no relative movement, but are firmly locked, causing the casing and driven shaft to rotate in unison.

If, as is almost unavoidable, a certain percentage of oil leaks past the pistons into the casing, the efficiency of the device is destroyed, since perfect operation depends on the valve chamber and connected areas being completely filled with oil.

It is to restore this condition when leakage takes place that I provide the ports 10, the action being as follows:—

Suppose a certain amount of oil to have leaked past the various pistons into the casing sump. Then when any piston moves inwardly—take for instance the upper piston in Fig. 2—there will not be enough oil to fill the cylinder beyond the piston, and a partial vacuum will be had. With the rapid rotation of the casing, what oil is in the cylinder will be thrown outwardly, by reason of centrifugal force, leaving the empty or vacuum space next to the piston head.

At the same time, the ports 10 are uncovered, and they are then within the area of low pressure or partial vacuum. A certain portion of the oil within the casing—which is maintained at least partly filled under normal conditions—will then be drawn into the cylinder, to restore the oil-filled condition thereof. Of course the uncovering of the ports 10 is momentary, but takes place in every cylinder and with every stroke of the pistons. This sucking-in of the oil therefore, while very slight for each stroke, is continuous as long as any tendency to vacuum is in the cylinders.

It will be noted that while the member 1 and the cover 11 are shown and described as separate parts, as is necessary for manufacturing and assembling, to all intents and purposes they form a single unit, in which the movable parts are enclosed, and in the claims these parts are referred to as the casing.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. An oil pressure clutch comprising a closed casing, radially disposed cylinders therein, pistons in the cylinders, a driven shaft journaled in the casing, operative connections between the shaft and pistons whereby the reciprocatory movements of the latter will be opposed to each other, a rotary valve member mounted in the casing and surrounding the shaft, an oil chamber formed in the valve and extending continuously therearound, passageways formed in the casing and extending radially from the peripheral ends of the cylinders, and ports in the valve leading from the chamber to the periphery thereof and adapted to communicate with the passageways.

2. An oil pressure clutch comprising a closed casing, radially disposed cylinders therein, pistons in the cylinders, a driven shaft journaled in the casing, operative connections between the shaft and pistons whereby the reciprocatory movements of the latter will be opposed to each other, an oil reservoir for all the cylinders independent of the interior space in the casing, passageways leading from the reservoir to the outer ends of the cylinders, said reservoir, passageways and cylinders being normally completely oil-filled, and ports leading from the interior of the cylinders to the interior of the casing, said ports being only uncovered when the corresponding pistons are at their innermost position with respect to the shaft, there being a quantity of oil maintained in the casing.

In testimony whereof I affix my signature.

ALFRED D. GOODWIN.